US012768112B2

(12) United States Patent
Blanc-Scuderi et al.

(10) Patent No.: US 12,768,112 B2
(45) Date of Patent: Oct. 20, 2026

(54) DEVICE AND METHOD FOR A MECHANIZED SECURING OF FUNCTIONAL OBJECTS BETWEEN TWO RAILS

(71) Applicant: SOLAFIX SA, Ecublens (CH)

(72) Inventors: Zoé Blanc-Scuderi, Lausanne (CH); Léa Blanc, Romanel-sur-Lausanne (CH); Valentin Scuderi, Ecublens (CH); Simon Scuderi, Ecublens (CH)

(73) Assignee: SOLAFIX SA, Ecublens (CH)

( * ) Notice: Subject to any disclaimer, the term of this patent is extended or adjusted under 35 U.S.C. 154(b) by 603 days.

(21) Appl. No.: 18/258,173

(22) PCT Filed: Dec. 17, 2021

(86) PCT No.: PCT/IB2021/061900
§ 371 (c)(1),
(2) Date: Jun. 16, 2023

(87) PCT Pub. No.: WO2022/130307
PCT Pub. Date: Jun. 23, 2022

(65) Prior Publication Data

US 2024/0052579 A1 Feb. 15, 2024

(30) Foreign Application Priority Data

Dec. 18, 2020 (WO) .................. PCT/IB2020/062173

(51) Int. Cl.
*E01B 26/00* (2006.01)
*E01B 29/32* (2006.01)
(Continued)

(52) U.S. Cl.
CPC .............. *E01B 26/00* (2013.01); *E01B 29/32* (2013.01); *H02S 20/20* (2014.12); *H02S 30/00* (2013.01);
(Continued)

(58) Field of Classification Search
CPC ........ E01B 26/00; E01B 26/005; E01B 29/32; E01B 2/00; E01B 29/17; E01B 29/06;
(Continued)

(56) References Cited

U.S. PATENT DOCUMENTS

| | | | | |
|---|---|---|---|---|
| 6,112,670 A * | 9/2000 | Miller | E01B 29/06 104/9 |
| 6,807,909 B1 | 10/2004 | Coots | |
| 2009/0188406 A1* | 7/2009 | Sperling | E01B 29/26 104/307 |

FOREIGN PATENT DOCUMENTS

| | | | |
|---|---|---|---|
| DE | 20 2011 103 383 U1 | 11/2011 |
| EP | 0 056 497 A1 | 7/1982 |

(Continued)

OTHER PUBLICATIONS

Japanese Office Action dated Apr. 15, 2025 for JP Application No. 2023-537707.

(Continued)

*Primary Examiner* — Zachary L Kuhfuss
(74) *Attorney, Agent, or Firm* — Nixon & Vanderhye P.C.

(57) ABSTRACT

The invention relates to a device (1) for securing functional objects between the rails (2, 3) of a railway track comprising: —a base unit (4) sized so as to be disposed between the rails (2, 3), —a first securing element (5, 7) arranged so as to secure one part of the base unit (4) to one (2) of the rails, —a second securing element (6, 8) arranged so as to secure another part of the base unit to the other (3) of the rails, —at least one attachment element (9, 10) arranged so as to secure the base unit (4) to at least one functional object (11). The invention also relates to a method and a machine for placing and securing functional objects (11) between the rails (2, 3) of a railway track. The invention also relates to a reverse method and the machine can also be used for removing the functional objects (11).

17 Claims, 7 Drawing Sheets

(51) Int. Cl.
*H02S 20/20* (2014.01)
*H02S 30/00* (2014.01)
*E01B 2/00* (2006.01)
*F24S 25/63* (2018.01)

(52) U.S. Cl.
CPC ................ *E01B 2/00* (2013.01); *F24S 25/63* (2018.05); *Y02E 10/50* (2013.01)

(58) Field of Classification Search
CPC .......... E01B 29/05; E01B 29/26; E01B 29/00; E01B 29/16; E01B 29/02; E01B 27/17; E01B 2203/10; E01B 2203/16; E01B 35/00; E01B 29/20; E01B 29/04; E01B 27/16; H02S 20/20; H02S 30/00; Y02E 10/50; F24S 25/63
See application file for complete search history.

(56) References Cited

FOREIGN PATENT DOCUMENTS

| | | | | |
|---|---|---|---|---|
| EP | 2241674 | A2 | 10/2010 | |
| EP | 2842828 | A1 | 3/2015 | |
| EP | 2998439 | A1 | 3/2016 | |
| JP | S59135905 | A | 8/1984 | |
| JP | S59-135905 | U | 9/1984 | |
| JP | 2000-342485 | A | 12/2000 | |
| JP | 2014-234644 | A | 12/2014 | |
| JP | 2015-224428 | A2 | 12/2015 | |
| KR | 10-1253298 | B1 | 4/2013 | |
| KR | 1020190125681 | A | 11/2019 | |
| KR | 102098176 | B1 * | 4/2020 | ............... G05D 3/10 |
| KR | 2020-0057590 | A | 5/2020 | |
| WO | 2021074907 | A1 | 4/2021 | |
| WO | 2022130307 | A1 | 6/2022 | |

OTHER PUBLICATIONS

International Search Report for PCT/IB2021/061900 mailed Mar. 4, 2022, 7 pages.
Written Opinion of the ISA for PCT/IB2021/061900 mailed Mar. 4, 2022, 7 pages.
European Notification dated Jul. 28, 2025 for EP Application No. 21844050.1.
U.S. Appl. No. 19/164,849, filed Sep. 12, 2025; Scuderi et al.
International Search Report for PCT/IB2024/052381 mailed Jul. 5, 2024, 5 pages.
Written Opinion for the ISA for PCT/IB2024/052381 mailed Jul. 5, 2024, 6 pages.
Japanese Office Action dated Oct. 28, 2025 for JP Application No. 2023-537707.

* cited by examiner

DEVICE AND METHOD FOR A MECHANIZED SECURING OF FUNCTIONAL OBJECTS BETWEEN TWO RAILS

CROSS-REFERENCE TO RELATED APPLICATIONS

This application is the U.S. national phase of International Application No. PCT/IB2021/061900 filed Dec. 17, 2021 which designated the U.S. and claims priority to PCT/IB2020/062173 filed Dec. 18, 2020, the entire contents of each of which are hereby incorporated by reference.

FIELD OF THE INVENTION

The present invention relates to the railway field and more specifically the operation of the zones occupied by the railway lines.

STATE OF THE ART

In some countries, the rail network occupies a significant part of the territory. In Switzerland for example, the rail network comprises more than 5,000 km of railway lines.

There is moreover a growing need for surfaces available for depositing functional objects, notably in the energy and communications field. One sector that is particularly affected is the use of solar panels (photovoltaic, thermal or hybrid).

The patent documents JP 2014 234 644 and KR 10 125 32 98 disclose solar panels which are disposed between the rails of railway lines.

With the device of JP 2014 234 644, the panels are fixed by means of elements which must be inserted under the rails. The system described in KR 10 125 32 98 presents solar panels which are fixed onto the inner sides of the rails, by means of elastic elements, which has the effect of attenuating the vibrations induced in the panels when a train passes.

The placement and the fixing of these panels is however complicated and the installation time can be relatively lengthy. The elements for fixing to the rails are also directly linked to the functional panels. In this type of configuration, the panels therefore form a part of the fixing device and consequently are subject to undesirable mechanical stresses, potentially damaging the functional panels. The disposition of fixing elements on the functional panels also reduces the width of the panels. The functional surface, for example the number of photovoltaic cells, is consequently reduced.

Also, the fact of permanently fixing the panels to the rails or to the ties has the effect of greatly reducing or preventing the essential railway line upkeep maintenance works.

It would therefore be desirable to facilitate the fixing of the panels between the rails, to reduce the placement time thereof and, more generally, to reduce or eliminate all the abovementioned drawbacks.

GENERAL DESCRIPTION OF THE INVENTION

The aim of the present invention is notably to remedy the problems described in the preceding section. To this end, it relates to a device for fixing functional objects, for example photovoltaic panels, between the rails of a railway line. The device according to the invention is composed of at least:

- a base unit dimensioned so as to be disposed between said rails,

- a first fixing element arranged so as to fix a part of the base unit to one of said rails,
- a second fixing element arranged so as to fix another part of the base unit to the other of said rails,
- at least one attachment element arranged so as to fix the base unit to at least one functional object.

A "functional object" should be understood to be any object contributing to realization of a functionality that is sought. To this end, the following non-exhaustive list of functional objects can be cited: photovoltaic panels, thermal panels, hybrid panels, batteries, electrical conductors, fluidic elements.

The functional objects can have any geometry. It should however be dimensioned so as to dispose the functional objects between the rails of a railway line, without hampering rail traffic.

Preferably, each fixing element comprises a linked part secured to the base unit and a free end intended to contact the inner side of a rail.

Advantageously, each free end can be displaced relative to the base unit, between an idle position and an active position, the latter corresponding to a configuration in which the free end contacts the inner side of a rail and exerts against the latter a sufficient force to ensure an optimal fixing of the base unit to said rails.

According to a first embodiment of the invention, each fixing element comprises an articulated mechanism composed of at least two arms.

According to a second embodiment of the invention, each fixing element comprises a cylinder.

According to a third embodiment of the invention, each fixing element comprises an articulated mechanism composed of at least one rod and a pivoting triangular element.

Preferably, the base unit takes the form of a housing inside which is disposed at least a part of the fixing elements.

The invention relates also to an assembly composed of at least one device as described previously, a functional object and attachment elements for fixing the functional object to the base unit or to another functional object; the attachment elements being preferably adapted to allow an angular flexibility between the device and the one or two adjacent functional objects.

According to a preferential variant of the invention, the assembly is composed of several functional objects between which are disposed fixing devices. The functional objects are therefore indirectly fixed to the rails, through the fixing devices.

According to one embodiment, each attachment element is provided with a male part or a female part. Preferably, each pair of attachments comprises a locking piece intended to lock the link between the male part and the female part.

The invention relates also to a method for the placement and fixing of functional objects between the rails of a railway line; the method comprising the following steps:

- placement of a device, as described previously, between two rails,
- fixing of the base unit to the rails, by activation of the fixing elements,
- placement of a functional object between the rails, alongside the device or another functional object,
- attachment of the functional object to the device or to the other functional object, or vice versa.

Finally, the invention relates also to a railway machine for the placement of functional objects between the rails of a railway line; the machine comprising the following parts:

a motorized traction unit, for example a locomotive allowing the machine to be displaced over a section of railway line, a section for storing functional objects, a section for storing fixing devices, an assembly zone allowing the functional objects and the fixing devices to be linked to one another, a ramp disposed following the assembly zone to allow the continual placement of the functional objects and the fixing devices between the rails.

Advantageously, the machine further comprises a module for activating the fixing elements.

A reverse method and the machine can also be used for the removal of the functional objects.

DETAILED DESCRIPTION OF THE INVENTION

The invention will be better understood in this section, notably with a few illustrated examples.

LIST OF FIGURES

NUMERIC REFERENCES USED IN THE FIGURES

Figure 1:
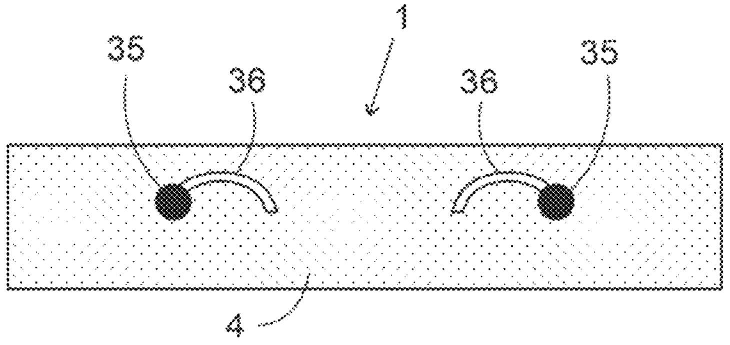
FIG. 1 represents a first variant of the fixing device according to the invention, in idle position (top view).
Figure 2:
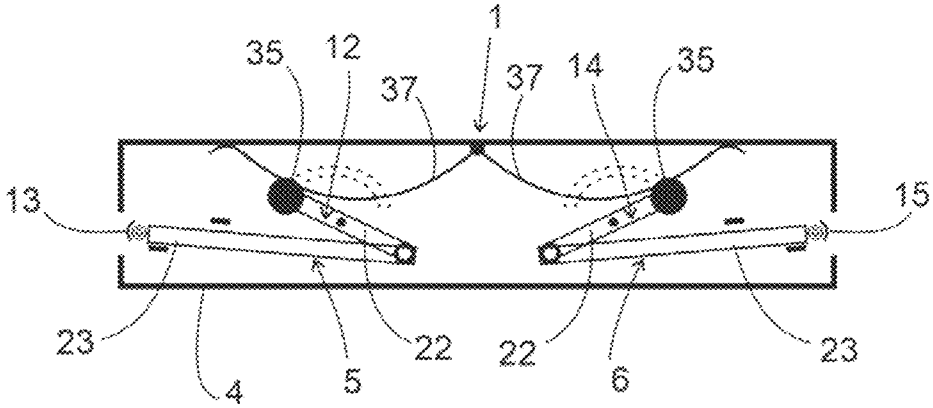
FIG. 2 represents the same view as FIG. 1, but without the top wall of the device.
Figure 3:
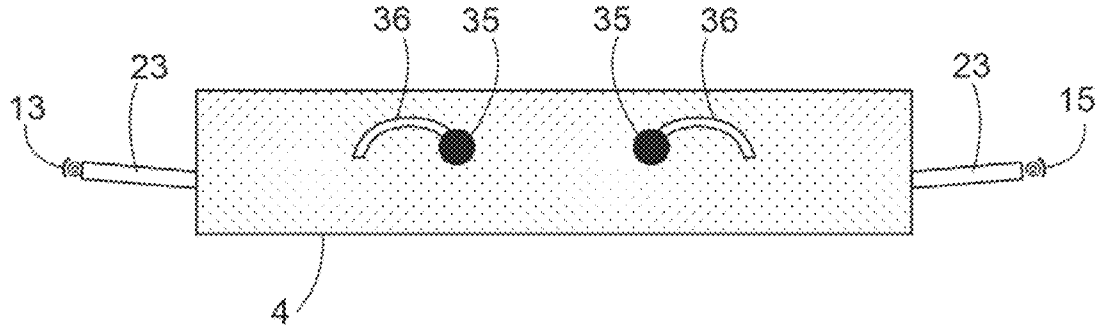
FIG. 3 represents the variant of FIG. 1 in active position (top view).
Figure 4:
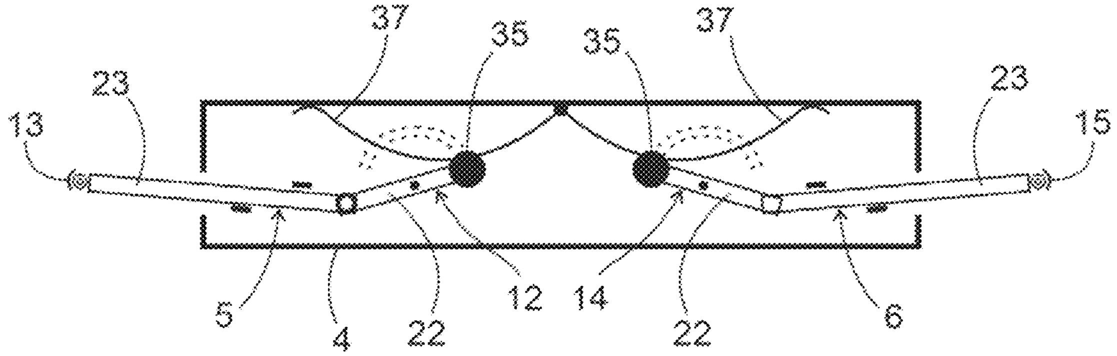
FIG. 4 represents the same view as FIG. 3, but without the top wall of the device.

1. Fixing device
2. First rail
3. Second rail
4. Base unit
5. First fixing element (variant 1)
6. Second fixing element (variant 1)
7. First fixing element (variant 2)
8. Second fixing element (variant 3)
9. Male attachment element
10. Female attachment element
11. Functional object
12. Linked part of the first fixing element (variant 1)
13. Free end of the first fixing element (variant 1)
14. Linked part of the second fixing element (variant 1)
15. Free end of the second fixing element (variant 1)
16. Linked part of the first fixing element (variant 2)
17. Free end of the first fixing element (variant 2)
18. Linked part of the second fixing element (variant 2)
19. Free end of the second fixing element (variant 2)
20. Linked part of the second fixing element (variant 3)
21. Free end of the second fixing element (variant 3)
22. First arm (variant 1)
23. Second arm (variant 1)
24. Cylinder
25. Rod
26. Pivoting triangle
27. Locking piece
28. Locomotive
29. Assembly zone
30. Storage section
31. Ramp
32. Fixing device activation module
33. Optical and technical control module
34. Segments of functional objects of fixing devices
35. Handle
36. Curved slit
37. Spring
38. Branch (variants 2 and 3).

Figure 5:
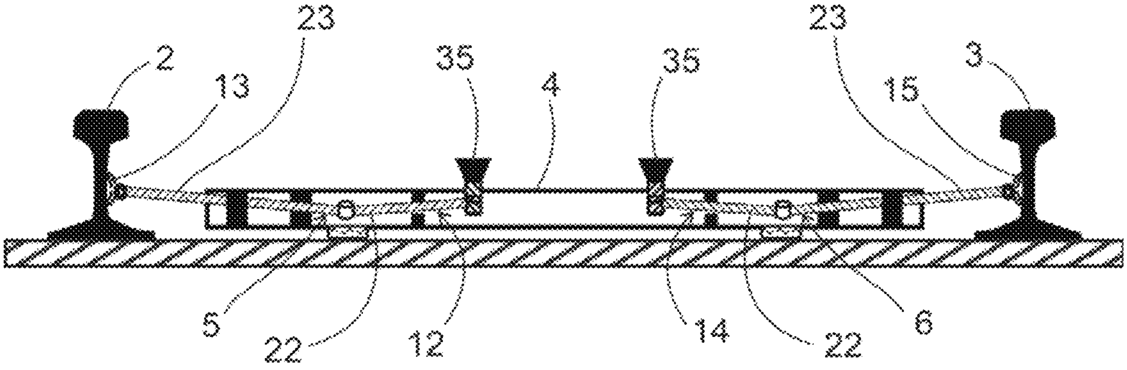
FIG. 5 represents the variant of FIG. 1, in active position (front view).
Figure 6:
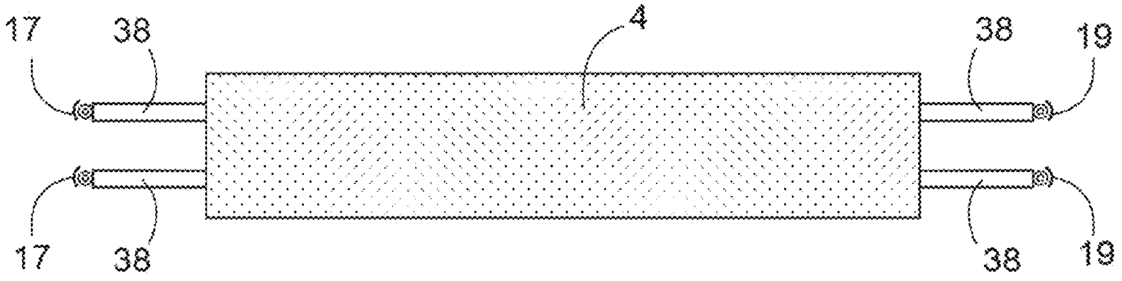
FIG. 6 represents a second variant of the fixing device according to the invention, in active position (top view).
Figure 7:
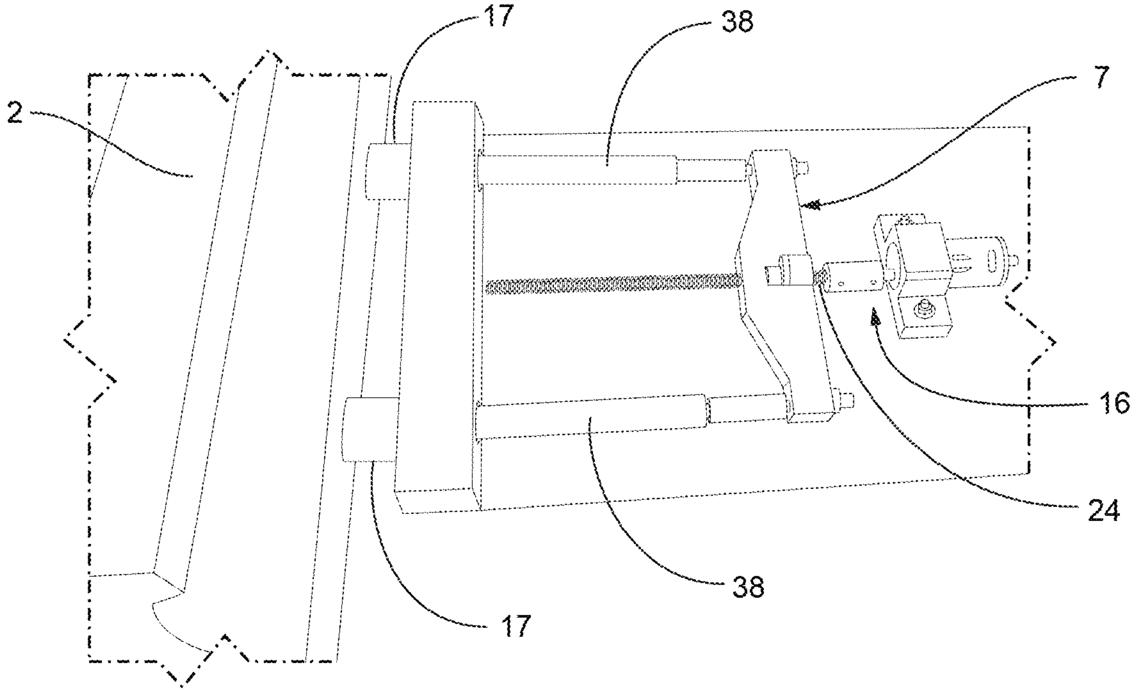
FIG. 7 represents a fixing element of the second variant, in idle position.
Figure 8:
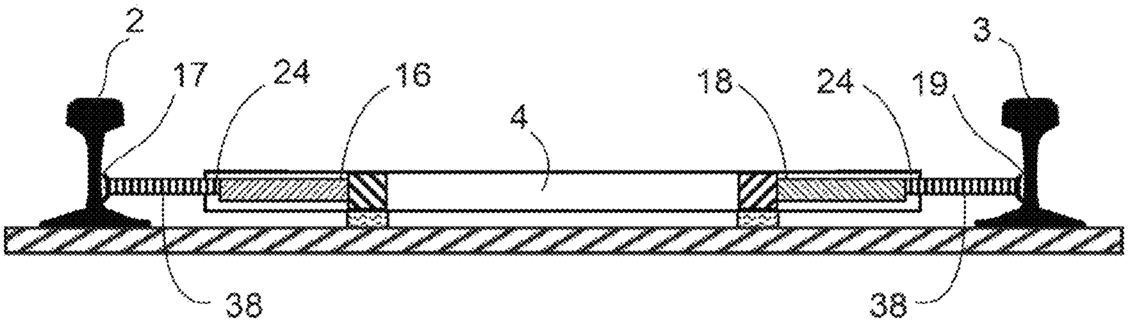
FIG. 8 represents the variant of FIG. 6, in active position (front view).
Figure 12:
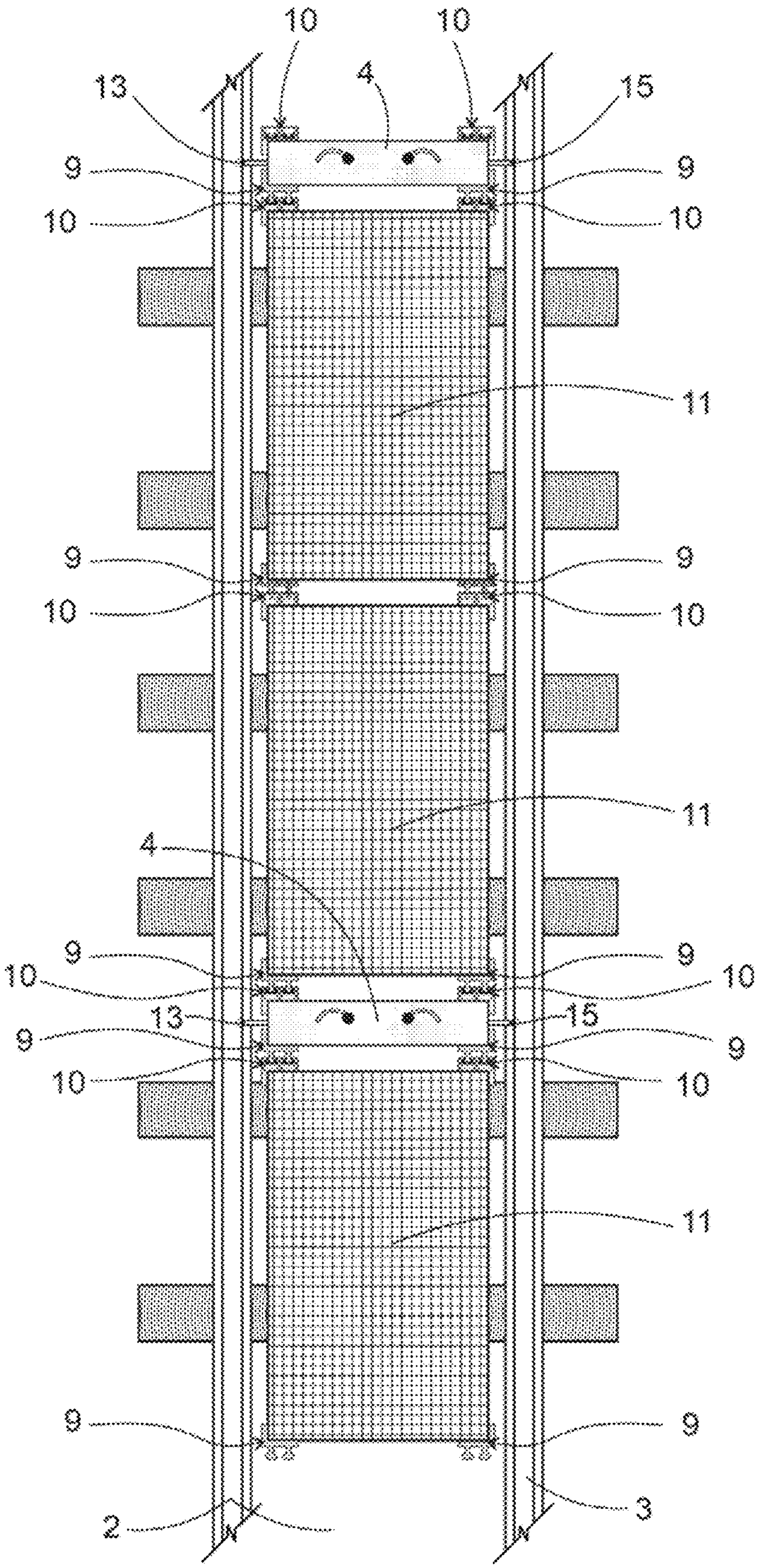
FIG. 12 shows a set of fixing devices according to the first variant and panels attached to the fixing devices.
Figure 13:
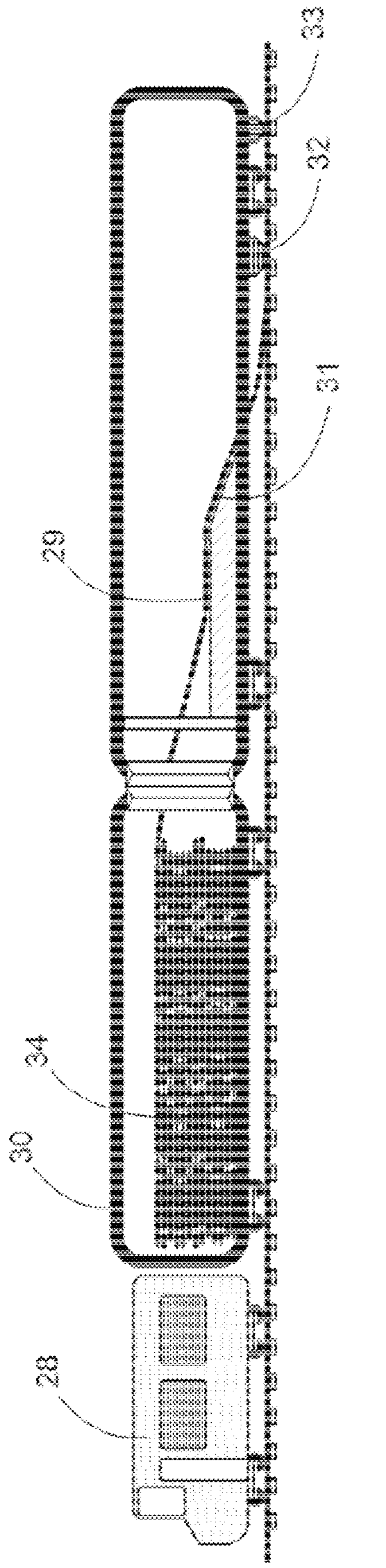
FIG. 13 shows an example of railway machine removing fixing devices and panels.

In the three variants illustrated (FIGS. 1 to 9 and 12), the fixing device 1 is composed of a base unit 4 in the form of a housing of dimensions less than the gauge of the rails 2, 3 (FIGS. 5, 8 and 12). It contains a mechanism making it possible to release fixing elements 5-8 being pressed onto the rails 2, 3, so as to exert a force that is sufficiently great on each side to be fixed securely to the rails.

By linking this fixing device 1 to each end of a functional object 11 (FIG. 12), it is thus possible to fix functional objects, for example photovoltaic panels, between two rails 2, 3.

In the first variant (FIGS. 1 to 5), each fixing element 5, 6 is composed of an articulated mechanism formed primarily by two arms 22, 23. Each fixing element 5, 6 comprises a linked part 12, 14 fixed to the base unit 4 by means of a rotation axis (black dot in FIGS. 2 and 4), and a free end 13, 15.

The articulated mechanism is activated by the displacement of handles 35 along curved slits 36 disposed in the top wall of the housing (see FIGS. 1 to 4). Upon the displacement of a handle 35, the axis of the handle 35 is subjected to a return force exerted by a spring 37 in circular arc form, the force being minimal when the device is in idle position (FIGS. 1 and 2) and when the device is in active position (FIGS. 3 and 4) the free ends 13, 15 emerge from the housing and press on the rails 2, 3 (see FIG. 5).

In the second variant (FIGS. 6-8), the fixing element 7 comprises a cylinder 24 coupled to two parallel branches 38 whose free ends 17, 19 press on the rails 2, 3 (FIGS. 7 and 8).

Figure 9:
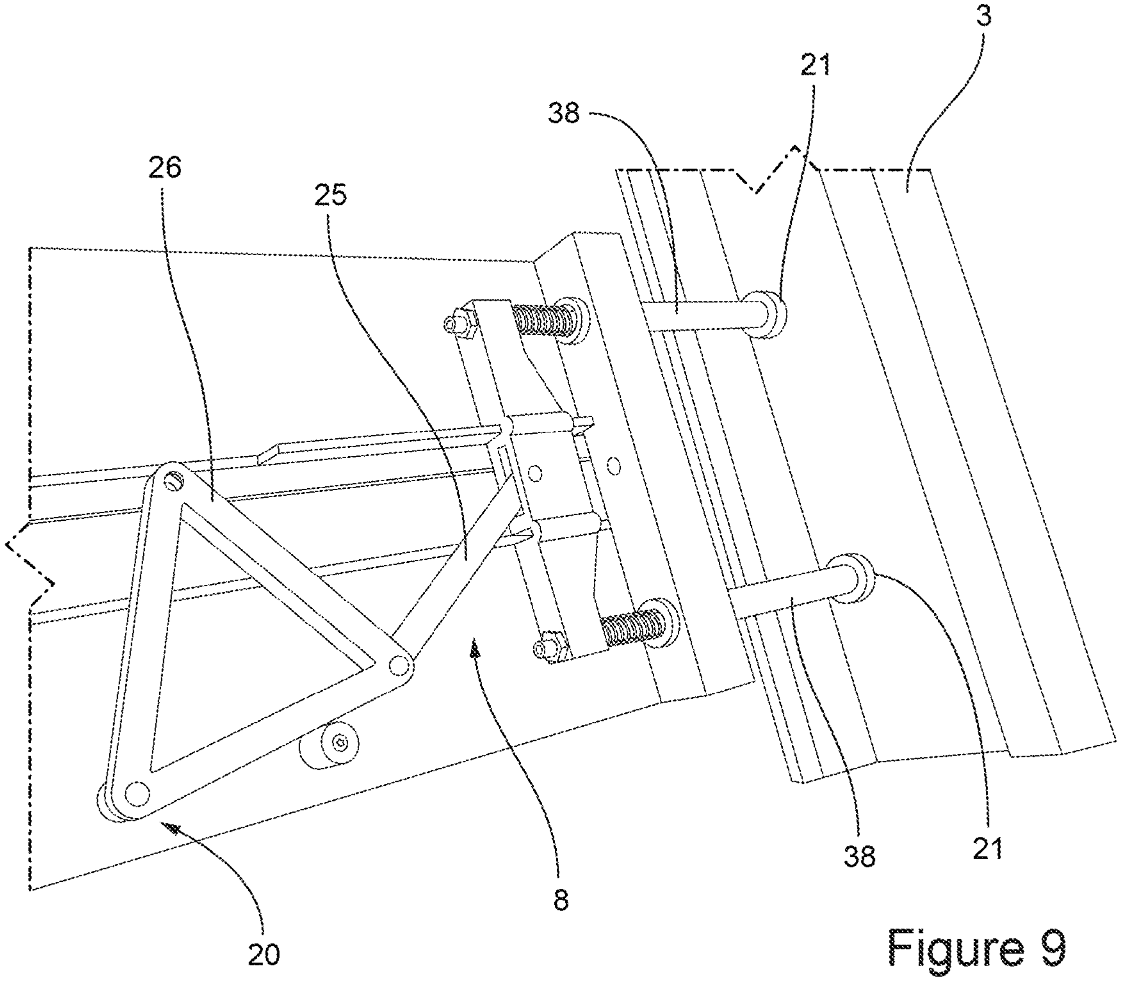
FIG. 9 represents a fixing element of a third variant, in active position.

In the third variant (FIG. 9), each fixing element 8 comprises a triangle 26 of which one vertex pivots about an axis fixed to the base unit 4 (left most vertex in FIG. 9). The fixing element 8 also comprises a rod 25 of which one end is mounted to pivot about another vertex of the triangle (right most vertex in FIG. 9) and the other being fixed to a piece comprising two parallel branches 38, the free ends 21 of which press on the rails 2, 3.

In summary, the fixing device comprises an idle position in which the free ends 13, 15, 17, 19, 21 are retracted in the base unit 4; and an active position in which the free ends 13, 15, 17, 19, 21 press on a rail 2, 3.

FIG. 12 shows a set of functional panels 11 and of fixing devices.

In this example, the functional panels 11 and the fixing devices alternate with one fixing device and two functional panels.

Other configurations are also possible, for example one functional panel, one fixing device, three functional panels, etc.

The link between two functional objects or between a fixing device and a functional object can be made in different ways.

Figure 11:
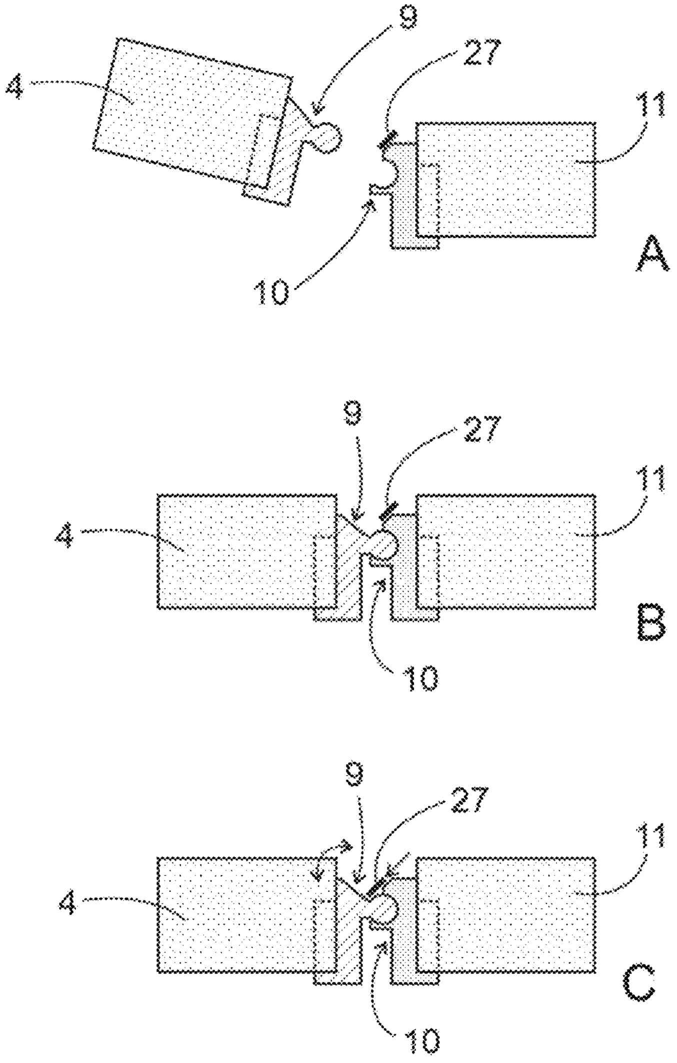
FIG. 11 represents the fixing of the attachment elements of FIG. 10 (side view).

Preferably however, preference is given to a link which allows an angular flexibility between two adjacent elements 11, 4, which offers the possibility of easily placing or removing the functional objects from a railway machine, along a ramp (FIG. 11).

Figure 10:
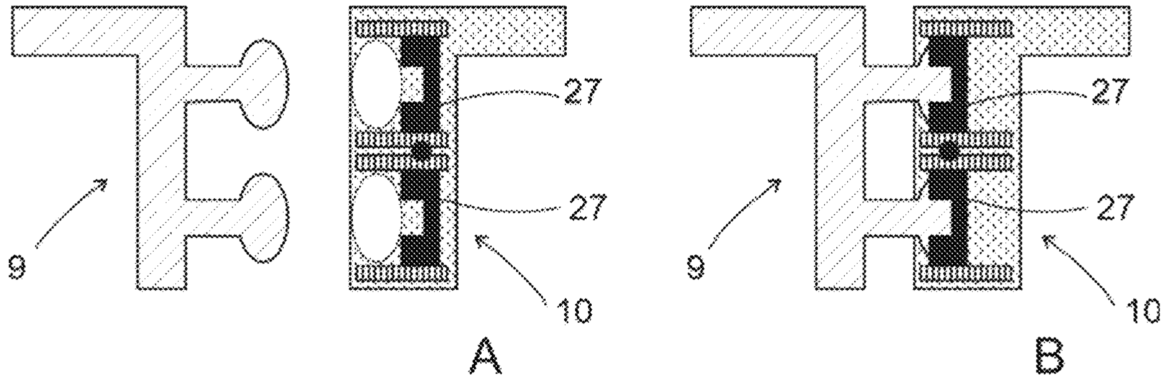
FIG. 10 represents an example of a pair of attachment elements (top view).

In the example illustrated in FIG. 10, the attachment elements are formed by a male part 9 and a female part 10.

Once the male part 9 is inserted into the female part 10, a locking element 27 is displaced so as to avoid accidental removal of the male part 9.

The disposition of functional panels 11, for example photovoltaic panels, in particular has the following features:

a) The functional panels 11 are provided with attachment elements 9, 10 to other functional panels 11 or to at least one fixing device 1.

b) The attachment elements 9, 10 are fixed to the fixing devices.

c) The fixing devices 1 are linked to the functional panels 11 so as to constitute segments of variable lengths. This operation can be performed at the time of placement or beforehand, so as to be able to install and link together entire segments.

d) The deployment of the fixing devices 1 makes it possible to solidly fix all the functional panels 11 to the rails 2, 3.

The railway machine represented in the example of FIG. 12 is composed of various sections:

a) A locomotive 28 allowing the machine to be displaced over a section of railway line.

b) A storage section 30 in which are placed segments 34 premounted with functional panels 11 and fixing devices 1.

c) An assembly section 29 allowing the different segments to be linked to one another.

d) A ramp 31 fixed to the assembly section 29 to allow the continual placement, between the rails 2, 3, of the different segments of functional panels 11 already linked to one another.

e) A module 32 allowing the opening and the closing of the fixing devices 1 for the placement or the removal of the installation.

f) An optical and technical control module 33.

It goes without saying that the invention is not limited to the examples discussed previously, but covers any object defined in the claims. It should be noted in particular that the two fixing elements of a same fixing device are not necessarily identical. It is therefore possible, for example, to provide a fixing device with a first fixing element according to the second variant and with a second fixing element according to the third variant.

The invention claimed is:

1. A device for a mechanized fixing of functional objects between the rails of a railway line comprising:

a base unit dimensioned so as to be disposed between said rails, a first fixing element arranged so as to fix a part of the base unit to one of said rails, a second fixing element arranged so as to fix another part of the base unit to the other of said rails, at least one attachment element configured so as to fix the base unit to at least one functional object., wherein the base unit comprises a housing inside which is disposed at least a part of the fixing elements and wherein each fixing element comprises an articulated mechanism.

2. The device as claimed in claim 1, wherein each fixing element comprises a linked part secured to the base unit and a free end intended to contact the inner side of a rail.

3. The device as claimed in claim 2, wherein each free end can be displaced relative to the base unit, between an idle position and an active position, the latter corresponding to a configuration in which the free end contacts the inner side of a rail and exerts against the latter a sufficient force to ensure an optimal fixing of the base unit to said rails.

4. The device as claimed in claim 1, wherein said articulated mechanism comprises at least two arms.

5. The device as claimed in claim 1, wherein said articulated mechanism comprises at least one rod and a pivoting triangular element.

6. An assembly comprising at least one device as claimed in claim 1, a functional object and attachment elements for fixing the functional object to the base unit or to another functional object.

7. The assembly as claimed in claim 6, wherein each attachment element is provided with a male part or a female part.

8. The assembly as claimed in claim 6, comprising a locking piece configured to lock the link between a male part and a female part.

9. A method for a mechanized placing and fixing of functional objects between the rails of a railway line, the method comprising:

placement of a device as defined in claim 1, between two rails, fixing of the base unit to the rails, by deployment of the fixing elements, placement of a functional object between the rails, alongside the device or another functional object, attachment of the functional object to the device or to the other functional object, or vice versa.

10. A railway machine for a mechanized placement and removal of functional objects between the rails of a railway line comprising:

a motorized traction unit configured for allowing the machine to be displaced over a section of railway line, a storage section for functional objects and fixing devices, an assembly zone configured for allowing the functional objects and the fixing devices to be linked to one another, a ramp disposed following the assembly zone to allow the continuous placement and/or removal of the functional objects and the fixing devices between the rails.

11. The machine as claimed in claim 10, further comprising a module for activating the fixing elements.

12. The machine as claimed in claim 10, further comprising an optical and technical control module.

13. A device for a mechanized fixing of functional objects between the rails of a railway line comprising:

a base unit dimensioned so as to be disposed between said rails, a first fixing element arranged so as to fix a part of the base unit to one of said rails, a second fixing element arranged so as to fix another part of the base unit to the other of said rails, at least one attachment element arranged so as to fix the base unit to at least one functional object, wherein the base unit comprises a housing inside which is disposed at least a part of the fixing elements and wherein each fixing element comprises an actuator.

14. The device as claimed in claim 13, wherein each fixing element comprises a linked part secured to the base unit and a free end intended to contact the inner side of a rail.

15. The device as claimed in claim 13, wherein each free end can be displaced relative to the base unit, between an idle position and an active position, the latter corresponding to a configuration in which the free end contacts the inner side of a rail and exerts against the latter a sufficient force to ensure an optimal fixing of the base unit to said rails.

16. An assembly comprising of at least one device as claimed in claim 13, a functional object and attachment elements for fixing the functional object to the base unit and/or to another functional object.

17. A method for a mechanized placing and fixing of functional objects between the rails of a railway line, the method comprising:

placement of a device as defined in claim 15, between two rails, fixing of the base unit to the rails, by deployment of the fixing elements, placement of a functional object between the rails, alongside the device or another functional object, attachment of the functional object to the device or to the other functional object, or vice versa.

* * * * *